Oct. 24, 1967     S. P. BURNS ETAL     3,348,502
MULTI-POSITION HITCH ON RAILROAD CAR Original Filed Sept. 30, 1963            7 Sheets-Sheet 1

INVENTORS
Samuel P. Burns
Robert H. Bauer
BY
Barnes, Kisern & Purie
ATTORNEYS

Oct. 24, 1967   S. P. BURNS ET AL   3,348,502
MULTI-POSITION HITCH ON RAILROAD CAR
Original Filed Sept. 30, 1963   7 Sheets-Sheet 2

INVENTORS.
Samuel P. Burns.
Robert H. Bauer.
BY
Harness, Dickey & Pierce.
ATTORNEYS.

Oct. 24, 1967    S. P. BURNS ETAL    3,348,502
MULTI-POSITION HITCH ON RAILROAD CAR
Original Filed Sept. 30, 1963    7 Sheets-Sheet 4

FIG.6

INVENTORS.
Samuel P. Burns.
Robert H. Bauer.
BY
Carness, Dickey & Pierce.
ATTORNEYS.

Oct. 24, 1967  S. P. BURNS ETAL  3,348,502
MULTI-POSITION HITCH ON RAILROAD CAR
Original Filed Sept. 30, 1963  7 Sheets-Sheet 6

INVENTORS
Samuel P. Burns
Robert H. Bauer
BY
Harness, Dickey & Pierce
ATTORNEYS

United States Patent Office 3,348,502
Patented Oct. 24, 1967

3,348,502
MULTI-POSITION HITCH ON RAILROAD CAR
Samuel P. Burns, Fraser, and Robert H. Bauer, Dearborn, Mich., assignors to Fruehauf Corporation, Detroit, Mich., a corporation of Michigan
Original application Sept. 30, 1963, Ser. No. 312,406, now Patent No. 3,204,579, dated Sept. 7, 1965. Divided and this application Mar. 30, 1965, Ser. No. 454,232
4 Claims. (Cl. 105—368)

This is a division of our copending application Ser. No. 312,406 filed Sept. 30, 1963, now Patent No. 3,204,579.

This invention relates generally to railway transportation equipment, and more particularly to an improved multi-purpose railcar.

The advent of containerized shipping has emphasized the need for an improved container handling railcar capable of use with several of the now existing modes of containerized shipping thereby to maximize the efficiency and use of such containers. The advantages of containerized shipping are obviously lost when a shipper is forced to utilize single purpose handling equipment which is incompatible with other containerized shipping systems. The resultant duplication of equipment having a similar function but of different dimensional mechanical characteristics results ultimately in increased shipping costs which are passed along to the consumer.

The present invention is directed to a railcar that is compatible with three prominent modes of containerized shipment, namely, "piggyback" shipment wherein an entire semi-trailer including the rear wheel suspension is mounted on a railcar; "Flexi-Van" shipment wherein a container is removed from its wheel suspension and mounted directly on the railcar on a complementary turntable and kingpin stanchion or hitch; and "lift-on"-"lift-off" service, wherein containers are hoisted to and from a rail car by an overhead crane or the like and secured to the railcar by suitable tie-down apparatus.

A number of specific requirements are promulgated by the application of a railcar to the aforementioned shipping systems, which requirements not only are satisfied by the instant invention but met to a heretofore unknown degree.

In order to be compatible with the three aforementioned modes of container shipment, as well as to have maximum utility as a conventional flat car, a railcar in accordance with the instant invention comprises a long relatively flat car having a minimum of obstructions above normal deck height.

All superstructure required for a particular mode of transportation is securable to the surface of the railcar thereby to handle containers of any known size and weight within the car unit loading and railway clearance restrictions.

As discussed hereinbefore the special purpose equipment on the railcar of the instant invention has been engineered to operate and function in various combinations to load, locate and secure two trailers in piggyback service, two containers in Flexi-Van service, two or more containers in lift on-lift off service, or any mixture of trailers and containers where routing and terminal facilities permit such an arrangement. Thus, a full equipped combination railcar will accommodate either eight 10′ containers, four 20′ containers, two 30′ containers, two 35′ containers, two 36′ containers, or two 40′ containers.

In order to facilitate handling of both Flexi-Van type containers and "piggyback" over-the-road equipment, the railcar of the instant invention features a combination hitch useable in both the piggyback and Flexi-Van configurations. The hitch is rigged differently for the two modes of service.

The hitch is capable of movement in translation longitudinally along the center line of the railcar for a distance of approximately 5 feet which freedom is proved to compensate for various lengths of trailers and for various locations of trailer kingpins. Further, variations due to manufacturing tolerances and for dynamic travel of the elastic secondary shock mountings must be compensated for.

The dual purpose kingpin stanchion is normally retractable to a height of 5⅝″ above deck. The nominal erected height of the coupler contact surface on the stanchion of the hitch is 47″ above deck surface. In this attitude, the front of a trailer is supported directly through vertically positioned support legs. A telescoping rubber cushioned strut leg reacts against longitudinal forces. Actuation of one lead screw either elevates or collapses the kingpin stanchion of the hitch. Actuation of a second lead screw either secures or releases the trailer kingpin. Actuation of lead screws is performed with electric torque wrenches presently available at most rail terminals.

The hitch operates as an oscillating kingpin receiver and front of container support in Flexi-Van service. Longitudinal positioning of the Flexi-Van container is accomplished by securement thereof to a turntable at the rear of the railcar. The stanchion of the hitch is engineered to oscillate in the longitudinal direction to compensate for cushion travel inherent in the turntable.

An auxiliary vertical support leg arrangement is provided to erect the coupler contact surface of the kingpin stanchion 10⅝″ above the deck surface. Erection is accomplished by actuation of the same elevating screw as provided for piggyback service.

Oscillation of the kingpin receiver is necessary in order to accomplish the side loading and unloading of Flexi-Van containers. Thus, the entire hitch including the kingpin stanchion assembly oscillates laterally either to the right or left of the railcar to transfer the front end of the container between the tractor fifth wheel and the railcar. Securement of the container kingpin is accomplished by operation of the same locking device as used for piggyback service. Vertical and lateral securement of the stanchion to the railcar is automatic when centered.

In piggyback and lift on-lift off container services, the Flexi-Van turntable of the railcar is rigged in its stowed position and the sides thereof align to center wheel guide curbs on the railcar deck. When rigged for Flexi-Van service, the turntable provides the necessary sloped lead on rails, rear of container support rails, a container to turntable positioning and shot pin actuation system which positions and secures the container, and a center of car pivot for table rotation.

The turntable is secured to the railcar through a center of car pivot which depends from a generally diamond shaped inner frame structure. An outer frame structure incorporates the container support and securement devices. Four large rubber cushioned mounts loaded in combination compression and shear join the inner and outer structures. These mounts have dual functions as a device to compensate for mechanical misalignment and angular deflections in the loading process and also to provide lading and container protection due to their longitudinal lateral and vertical cushioned displacement.

When the railcar is rigged for lift on-lift off container service a rubber shock type mount adapter assembly is utilized for securement of containers to the railcar. The shock mounts have been engineered to conform to the container size standards adopted by the American Standards Association and to the proposed standards under current consideration for container corner castings, fittings and handling equipment. Provision has also been made to secure containers of different lengths by the same corner securement method.

The height of the bottom of the containers above the deck surface in lift on-lift off srevice is nominally 6¾". The primary function of the rubber shock mounts is to equalize the applied load onto the four corner mounts and to adjust for alignment with holes in the container. They also provide lading and container structure protection due to their longitudinal, lateral and vertical cushioned displacement.

Accordingly, the broad object of the instant invention is a multi-purpose railcar capable of handling three modes of containerized shipping, namely, piggyback semi-trailers, Flexi-Van shipping containers and lift on-lift off shipping containers.

Another object is a railcar in accordance with the previous object that is useable as a conventional flat car.

Another object is a railcar having a multi-purpose hitch or kingpin stanchion useable in different modes of shipment.

Another object is an improved multi-purpose hitch capable of movement laterally of a railcar to effect engagement with a Flexi-Van container.

Another object is a multi-purpose hitch that is elevatable to a plurality of different heights for engagement of containers in different modes of shipment.

Other objects and advantages of the instant invention will be apparent in the following specification, claims and drawings, wherein:

Figures 1, 2:
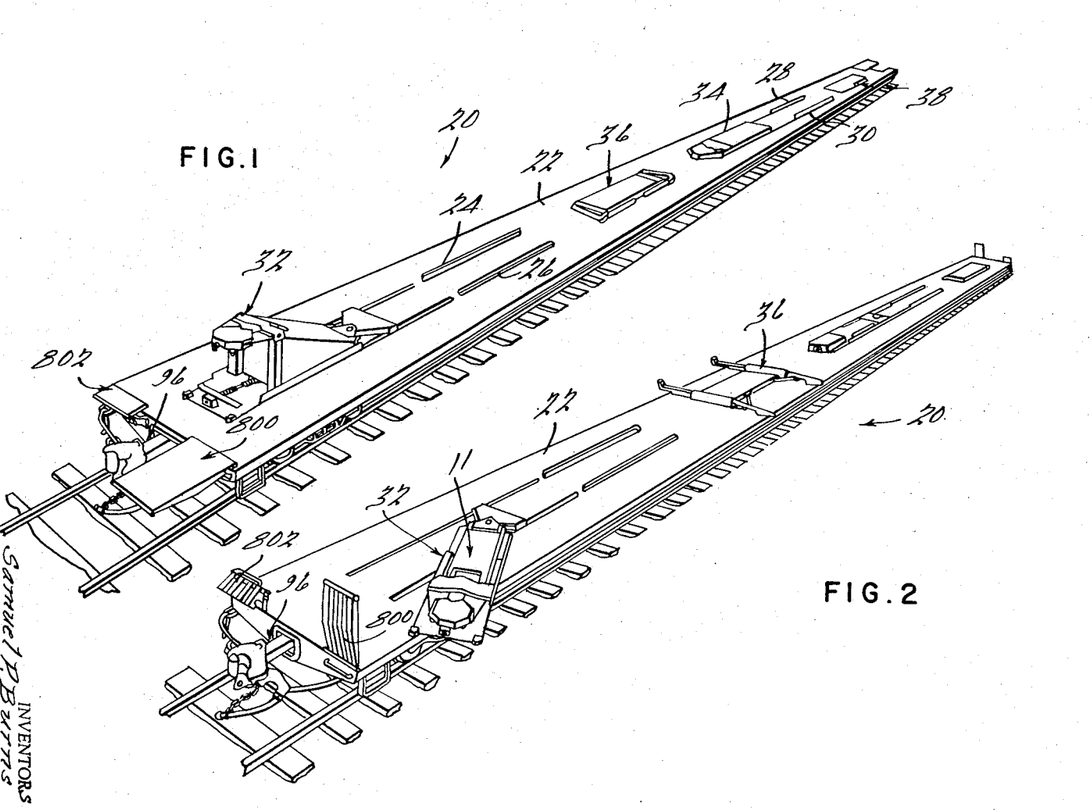
FIGURE 1 is a perspective view of a multi-purpose railcar in accordance with an exemplary constructed embodiment of the instant invention rigged for the acceptance of a piggyback semi-trailer.
FIGURE 2 is a perspective view, similar to FIGURE 1, showing the railcar rigged for the acceptance of a Flexi-Van container.

As best seen in FIGURE 1 of the drawings, a multi-purpose railcar 20, in accordance with an exemplary constructed embodiment of the instant invention, features a relatively clean flat deck 22 to which a number of special purpose equipment installations are secured, as will be described. The special purpose equipment comprises spaced parallel pairs of wheel guide curbs 24, 26, 28 and 30, a pair of kingpin hitches or stanchions 32 and 34 at opposite ends of the railcar 20, and a pair of turntables 36 and 38 which, in combination with the kingpin hitches 32 and 34, respectively, condition the railcar for operation in the Flexi-Van configuration. It is to be noted that the aforementioned components form a plurality of fixed and relocatable curb sections that amount to a continuous center of car wheel guide system to guide trailers on to the railcar 20 when the railcar 20 is in the piggyback configuration. It is also to be noted that when the hitches 32 and 34 are lowered, the railcar 20 presents a minimum of above deck obstructions to facilitate operation of the railcar 20 in the lift on-lift off configuration or as a general purpose flat car.

As seen in FIGURE 2 of the drawings, forward portion of the railcar 20 is condiitoned for the acceptance of a Flexi-Van container. Thus, the turntable 36 is rotated to the accepting condition, as will be described in more detail hereinafter. The kingpin hitch 32 is elevated to the Flexi-Van position, as will be more particularly described, and rotated laterally of the deck 22 to accept the kingpin of the Flexi-Van container as it moves toward the railcar 20.

Figure 3:
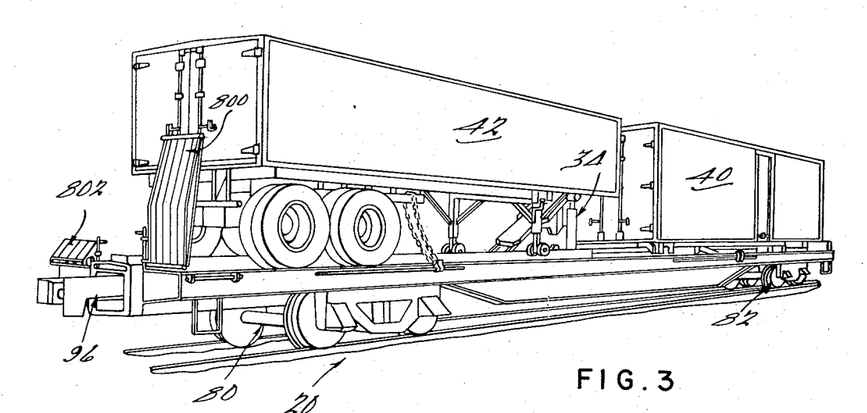
FIGURE 3 is a perspective view showing the railcar in the ready-to-roll condition with a piggyback semi-trailer and Flexi-Van container mounted thereon.
Figure 4:
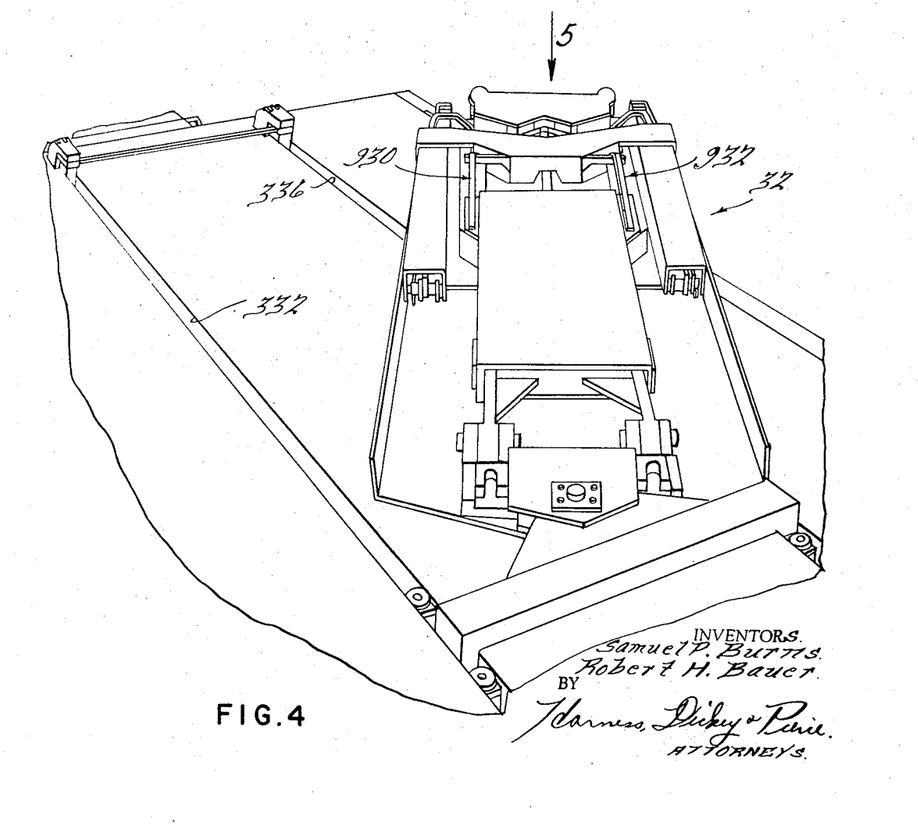
FIGURE 4 is a perspective view of the improved multi-purpose hitch of the instant invention shown in the laterally cocked position for the acceptance of a kingpin of a Flexi-Van container.

As best seen in FIGURE 3, a Flexi-Van container 40 is mounted on one end of the car 20 and a piggyback trailer 42 is mounted on the other end, the kingpin thereof being supported by the hitch 34.

Figure 5:
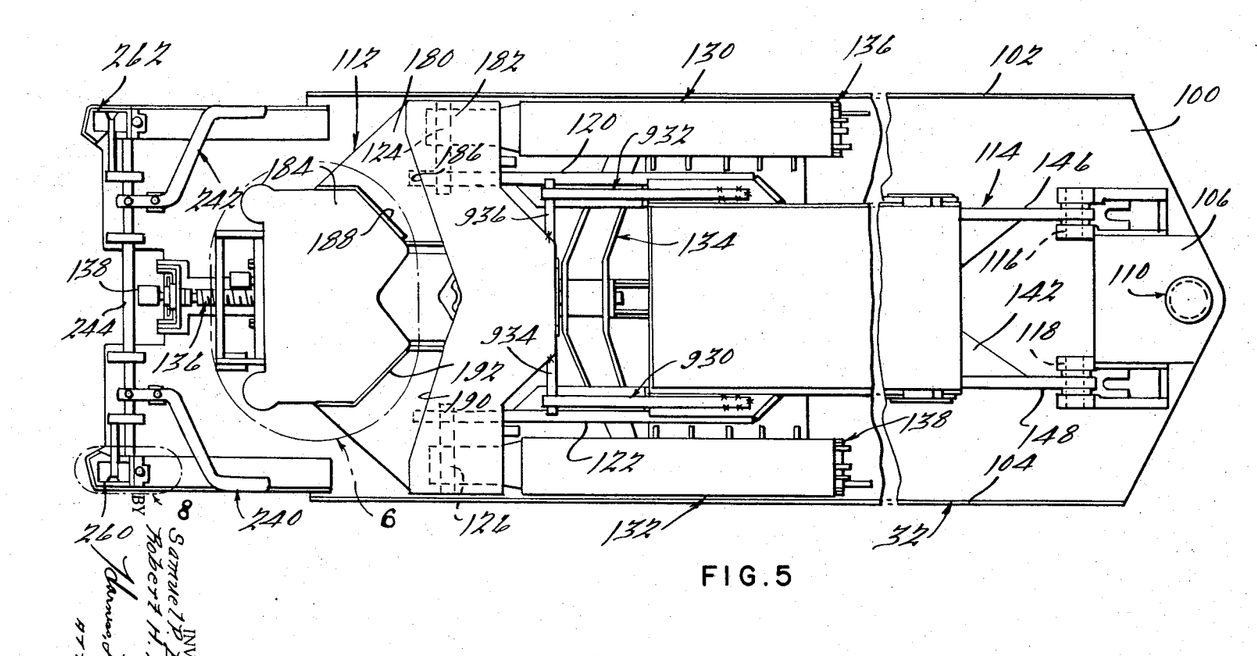
FIGURE 5 is a view taken substantially in the direction of the arrow 5 of FIGURE 4.

As best seen in FIGURE 5, in accordance with one feature of the instant invention, the hitch 32 comprises a generally flat plate 100 having upwardly folded edge portions 102 and 104. The hitch 32 is pinned at one end 106 thereof to a hitch positioning mechanism, to be described, as by a relatively substantial vertically extending pin 110. The hitch 32 comprises essentially a screw-operated mechanism that effects elevation of an upper coupler assembly 112.

The elevating mechanism comprises a strut leg 114 that is pivotally secured to the plate 100 as by a pair of pins 116 and 118. The other end of the strut leg 114 is pivotally secured to the upper coupler 112 through extensions 120 and 122 as by a pair of pins 124 and 126 that are fixedly secured to the upper coupler 112.

A pair of outer support legs 130 and 132 are pivotally coupled to the upper coupler 112 by the pins 124 and 126, as well as to an elevating yoke 134 as by pins 136 and 138. As best seen in FIGURES 25 and 26, the elevating yoke 134 is movable longitudinally of the plate 100 of the hitch 32 under the influence of a nut 135 on the yoke 134 that is engaged with a screw 136 having a socket 138 thereon for the acceptance of the output shaft of a conventional electric torque wrench (not shown). As the yoke 134 is drawn to the left, as seen in FIGURE 25 of the drawings, the pins 136 and 138 are also moved to the left thereby erecting a triangle defined by the legs 130 and 132, the strut leg 114, and the base plate 100 of the hitch 32. The upper coupler 112 is supported at the upper apex of the triangle defined by the legs 130, 132 and strut leg 114 in the erected condition.

Figure 6:
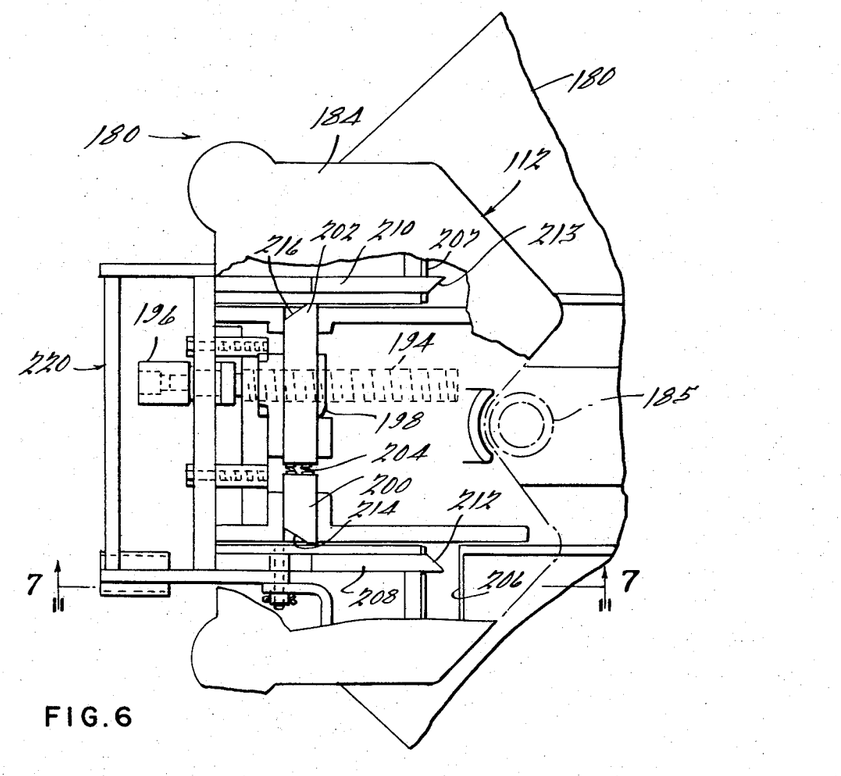
FIGURE 6 is an enlarged fragmentary view, partially broken away, of the area within the circle 6 of FIGURE 5.
Figure 7:
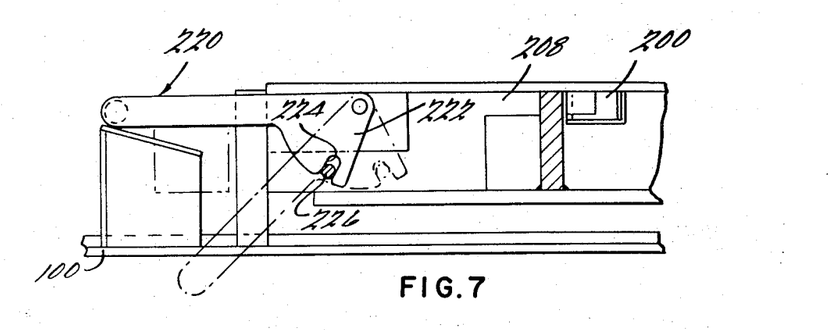
FIGURE 7 is a cross sectional view taken substantially along the line 7—7 of FIGURE 6.
Figure 8:
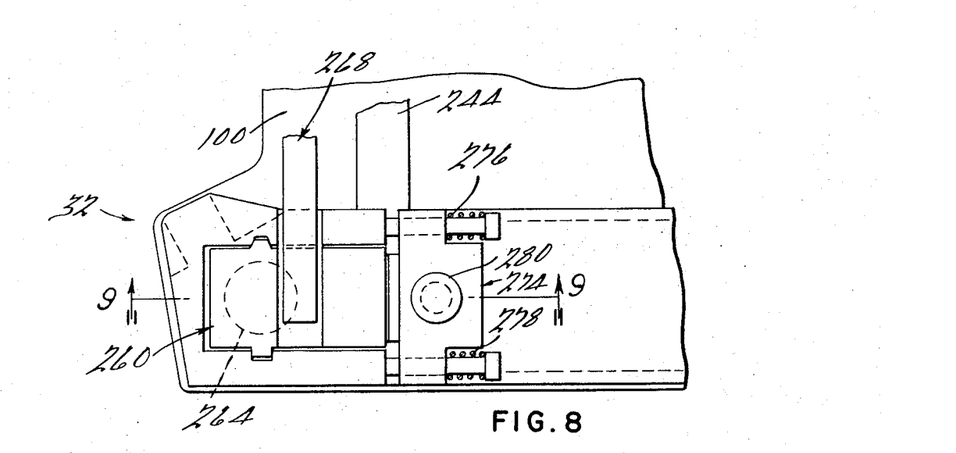
FIGURE 8 is an enlarged fragmentary view taken substantially within the circle 8 of FIGURE 5.
Figure 9:
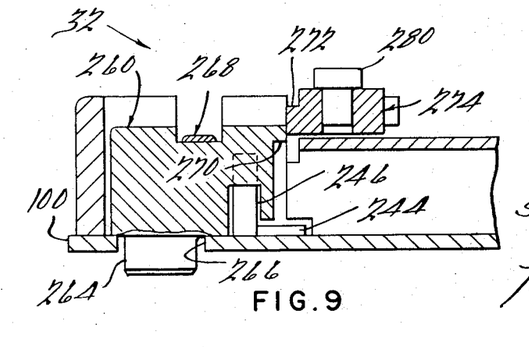
FIGURE 9 is a cross sectional view taken substantially along the line 9—9 of FIGURE 8.
Figure 10:
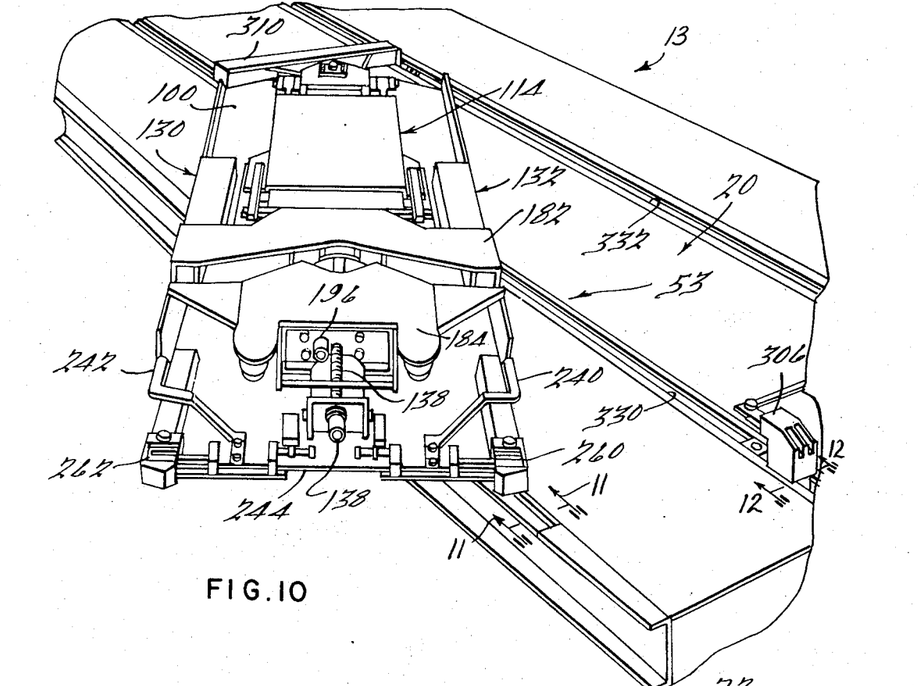
FIGURE 10 is a view similar to FIGURE 4 showing the opposite end of the multi-purpose hitch.

As best seen in FIGURES 5 and 6, the upper coupler 112 comprises a suport plate 180 having a fixed jaw 182 and a movable jaw 184. The movable jaw 184 is supported for movement toward and away from the fixed jaw 182 for the locking acceptance of a kingpin 185 of either a trailer in the piggyback configuration of a Flexi-Van container when the hitch 32 is rigged in the Flexi-Van condition. It is to be noted that the fixed and movable jaws 182 and 184 have complementary convergent surfaces 186, 188, 190 and 192 to guide the kingpin 185 therebetween.

As best seen in FIGURE 6, the movable jaw 184 is controlled by a lead screw 194 that is journaled on the plate 180 and has a socket 196 at one end thereof for the acceptance of a conventional power-driven torque tool. The lead screw 194 extends through a complementary nut 198 on the movable jaw 184.

The movable jaw 184 is locked in the kingpin retaining condition by a pair of slide locks 200 and 202 that are engageable under the bias of a compressed spring 204, in complementary laterally extending slots 206 and 207 on the plate 180.

In order to effect retraction of the outer jaw 184, the slide locks 200 and 202 are retracted as by a pair of lock retractors 208 and 210 having cam faces 212 and 213 thereon that are engageable with complementary cam faces 214 and 216 on the slide locks 200 and 202 respectively, to effect retraction thereof against the bias of the spring 204.

Figures 13, 14, 15:
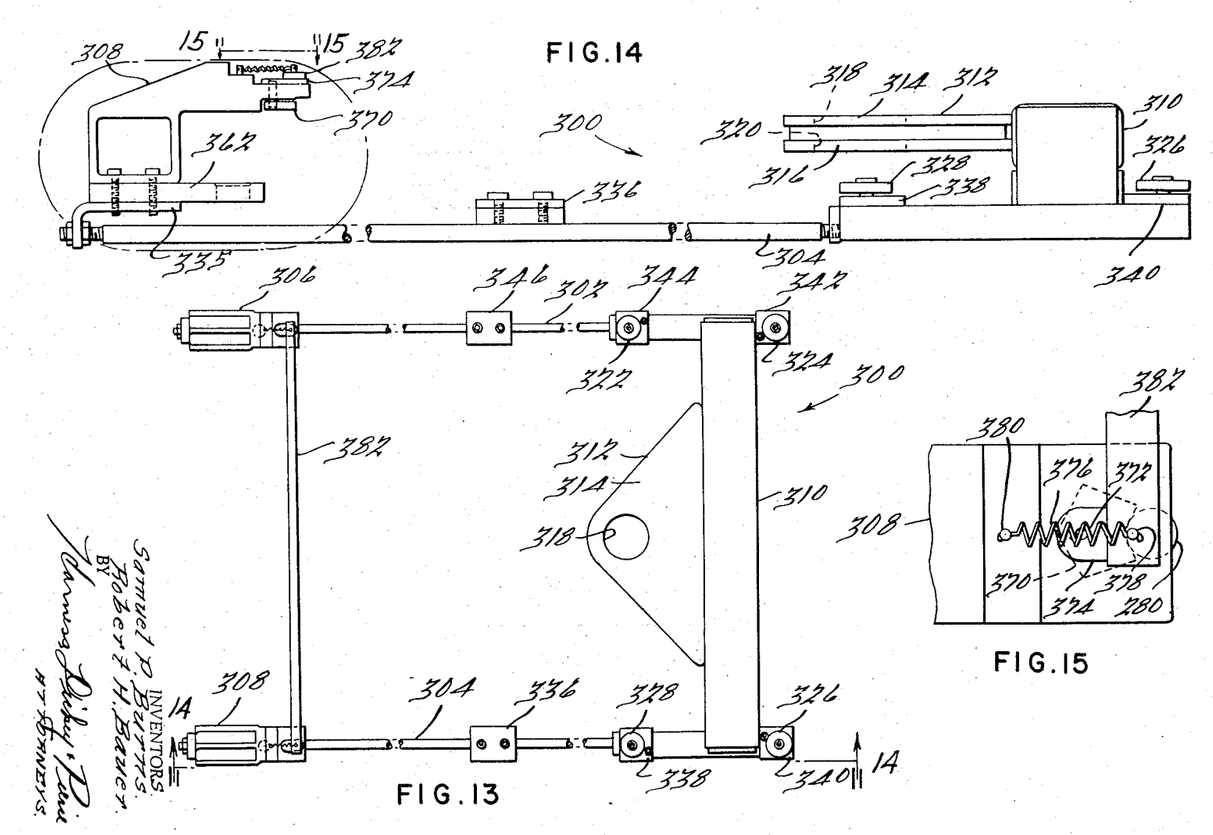
FIGURE 13 is a view taken substantially in the direction of the arrow 13 of FIGURE 10 with the positioning mechanism removed from its complementary ways in the railcar deck.
FIGURE 14 is a view taken substantially along the line 14—14 of FIGURE 13.
FIGURE 15 is a view taken susbtantially along the line 15—15 of FIGURE 14.

Movement of the slide lock retractors 208 and 210 is effected by a handle mechanism 200 having a pair of bellcranks, one of which is shown in FIGURE 14 and designated by then umeral 222. The bellcrank 222 has a slot 224 therein for the acceptance of a pin 226 on the slide lock retractor 208. Thus, counterclockwise movement of the handle 220 as seen in FIGURE 14 of the drawings, effects movement of the slide lock retractors 208 and 210 to the right thereby effecting retraction of the slide locks 200 and 202 and conditioning the movable jaw 184 for retraction under the influence of the screw 194.

As best seen in FIGURES 5-15 of the drawings, the hitch 32 is provided with a novel trigger and pin system for locating the hitch 32 at a desired angularly laterally outwardly extending position relative to the longitudinal axis of the railcar to facilitate reception of the kingpin of a Flexi-Van container. More particularly, as seen in FIGURE 5, a pair of operating handles 240 and 242 are pivotally secured to the plate 100 of the hitch 32 so as to effect reciprocation of a tiebar 244.

As best seen in FIGURES 13-15 of the drawings, a positioning mechanism 300 for the hitch 32 comprises a pair of elongated positioning bars 302 and 304 having a pair of receiver assemblies 306 and 308 at the ends thereof, respectively, and a rear bar 310 at the other end thereof, respectively. The bar 310 supports a tree assembly 312 comprising a pair of generally triangular plates 314 and 316 having aligned apertures 318 and 320 at the apex thereof for the acceptance of the locking pin 110 on the hitch 32.

Figures 11, 12:
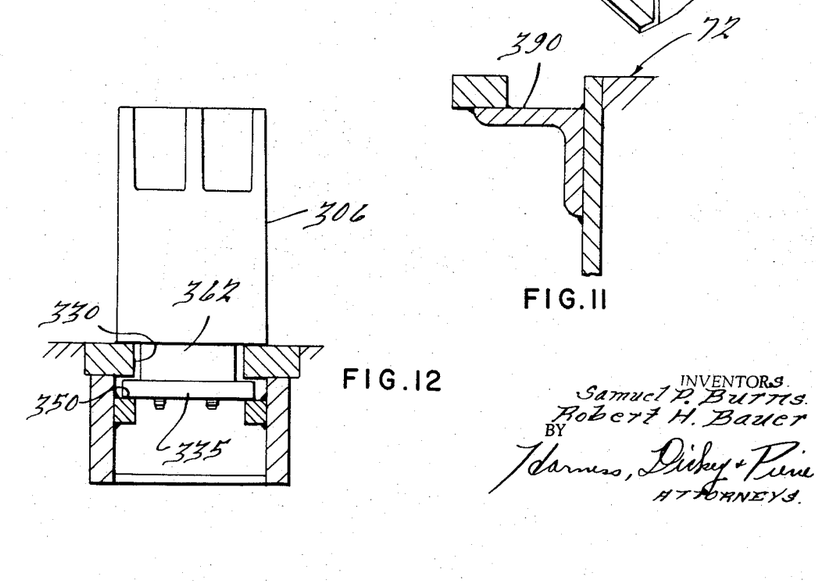
FIGURE 11 is a cross sectional view taken substantially along the line 11—11 of FIGURE 10.
FIGURE 12 is a cross sectional view taken substantially along the line 12—12 of FIGURE 10.

As seen in FIGURE 11 of the drawings, the railcar 20 is provided with a longitudinally extending groove 390 adjacent each of the outboard edges thereof for the acceptance of the pins 264 on the hitch 32 to lock the hitch at a desired angularly outwardly extending position for the acceptance of the kingpin of a Flexi-Van container.

Initially the hitch 32 is positioned centrally of the positioning mechanism 300 with the pins 264 engaged in the complementary apertures 364 in the receivers 306 and 308. Release of the pins 264 from the apertures 364 is effected by pulling on either the handle 240 or the handle 242 thereby effecting movement of the bar 244 and cams 246 at opposite ends thereof. Movement of the cams 246 in either direction effects elevation of the pin blocks 260 and therefore retraction of the pins 264. When the pin blocks 260 are elevated the triggers 274 are movable into engagement therewith under the bias of the springs 276 and 278 thereby to lock the pin blocks 260 in the retracted condition.

It is to be noted that each of the triggers 274 is provided with a circular cam 280 that is engageable with the pin lock cams 370 on the receivers 306 and 308. As the cams 280 move to the right or left relative to the positioning mechanism 300 the pin lock cams 370 are rotated in the direction of movement of the cams 280 and retained in this position by the springs 272. As the cam 280 on the far side of the hitch 32 relative to the direction of lateral movement thereof moves into engagement with the opposite pin lock cam 370 it is moved to the right as seen in FIGURES 15 and 16 of the drawings thereby releasing the associated pin block 260 for movement under the bias of the spring 268 into the associated groove 390 on the side of the railcar 20. In this manner the hitch 32 is positively positioned for the acceptance of the kingpin of a Flexi-Van container. After coupling with the Flexi-Van container the pins 264 are retracted in the manner discussed hereinbefore whereupon the container and hitch 32 are swingable into alignment with the central longitudinal axis of the railcar 20.

If it is desired to utilize the railcar 20 as a flat car totally devoid of above deck apparatus the turntable 36 and 38 and hitches 32 and 34 and wheel guide curbs 24, 26, 28 and 30 are removed therefrom resulting in a flat deck substantially as shown in FIGURES 5 and 6 of the drawings.

Normally, however, the railcar 20 can be utilized even as a flat car with the hitches 32 and 34, turntable 36 and 38 and other accessories secured thereto because of the minimum above height of these pieces of special purpose equipment.

As best seen in FIGURE 1 of the drawings when the railcar 20 is conditioned for use in the piggyback mode the hitch 32 is first elevated and a piggyback trailer rolled onto the car 20. The hitch 34 is then elevated to accommodate a second piggyback trailer or, alternatively, elevated to the intermediate condition for the acceptance of a Flexi-Van container, this loading condition is shown in FIGURE 3 of the drawings.

From the foregoing description it should be apparent that the multi-purpose railcar of the instant invention offers a step forward in the railcar art since it permits a shipper to use a single railcar where a number of railcars have heretofore been required. Versatility of the railcar of the instant invention is maximized by the use of the multi-purpose hitch which not only supports the kingpin of a piggyback trailer but also supports and in addition swings to accept the kingpin of a Flexi-Van container.

The turntable of the herein discussed railcar features a novel locking mechanism that is triggered by sensing the position of the Flexi-Van container. The turntable also features a secondary shock mount system that protects the lading as well as the Flexi-Van container from excessive shock and vibration. The turntable is foldable to lie between the wheels of a piggyback trailer.

The railcar 20 also features a number of improvements that contribute to the versatility thereof. For example, the bridge plates at opposite ends of the car are supported by a novel torsion bar assembly that minimizes the effort required to rotate the bridge plates between a loading and a rolling condition. Furthermore, the railcar is provided with a number of novel locking and retaining structures for the turntable, hitch, chains and lift on-lift off container coupler.

It is to be understood that the specific constructions of the improved railcar herein disclosed and described are presented for the purpose of explanation and illustration and are not intended to indicate the limits of the invention, the scope of which is defined by the following claims.

What is claimed is:
1. A multi-purpose railcar comprising,
 a generally flat deck having
 a ramp at one end thereof to facilitate loading of a heavy duty over-the-road semi-trailer having wheels at one end and a kingpin at the opposite end thereof,
 support means on the railcar elevatable to a relatively high position for engagement with the kingpin of said semi-trailer, and
 a turntable on said deck for the acceptance of one end of a wheelless container having a kingpin at the opposite end thereof,
 said elevatable support means being positionable at a relatively low position and rotatable about a vertically extending axis so as to extend angularly laterally outboard of the decks of said railcar to effect engagement with the kingpin on said wheelless con- tainer when said one end thereof is seated on said turntable, rotation of said support means about said vertical axis toward the deck of said railcar effecting movement of said wheelless container into alignment with said railcar.

2. A railcar in accordance with claim 1 including means for automatically indexing said support means to said laterally extending position.

3. A railcar in accordance with claim 1 including a positioning mechanism supporting said elevatable support means for rotation about said vertical axis relative to said railcar and movable longitudinally of said railcar.

4. A railcar in accordance with claim 1 including means for locking said support means at a position parallel to the longitudinal axis of said railcar and at said position extending angularly laterally of said railcar, selectively.

References Cited

UNITED STATES PATENTS

| | | | |
|---|---|---|---|
| 1,271,812 | 7/1918 | Wagner | 105—368 |
| 2,837,038 | 6/1958 | Fahland | 105—368 |
| 2,845,878 | 8/1958 | Gutridge | 105—368 |
| 2,933,052 | 4/1960 | Mellam | 105—368 |
| 3,095,987 | 7/1963 | Sable | 214—38 |
| 3,112,040 | 11/1963 | Levitt et al. | 214—38 |
| 3,143,083 | 8/1964 | Gutridge et al. | 105—368 |
| 3,145,006 | 8/1964 | Robinson et al. | 248—119 |
| 3,160,117 | 12/1964 | Willison et al. | 105—366 |
| 3,167,288 | 1/1965 | Farabaugh | 248—119 |

ARTHUR L. LA POINT, *Primary Examiner.*

D. E. HOFFMAN, *Assistant Examiner.*